No. 623,387. Patented Apr. 18, 1899.
W. TAYLOR.
BACK PEDALING BRAKE.
(Application filed Feb. 17, 1898.)
(No Model.) 2 Sheets—Sheet 1.
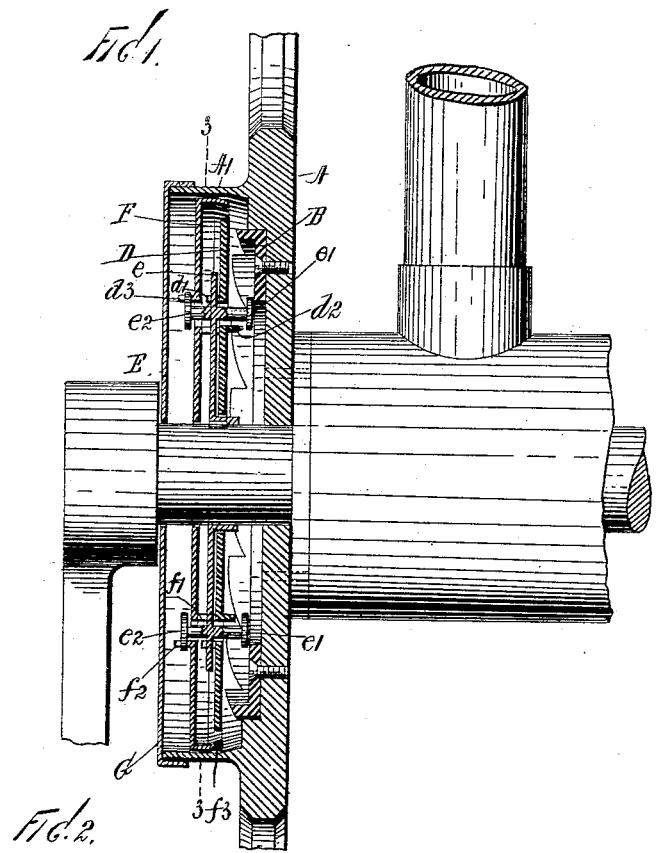
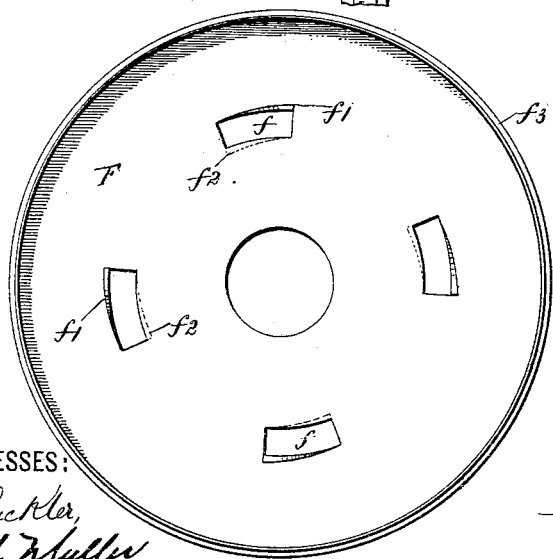
WITNESSES:
John Buckler,
L. M. Muller
INVENTOR
William Taylor
BY
Edgar Tate & Co.
ATTORNEYS No. 623,387. Patented Apr. 18, 1899.
W. TAYLOR.
BACK PEDALING BRAKE.
(Application filed Feb. 17, 1898.)
(No Model.) 2 Sheets—Sheet 2.
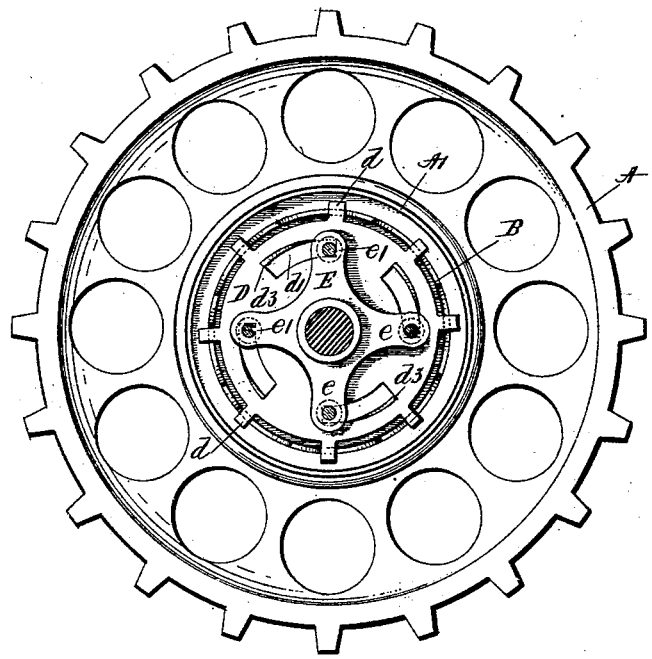
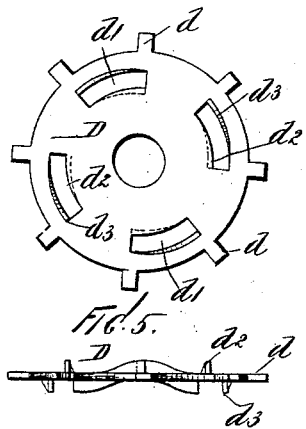
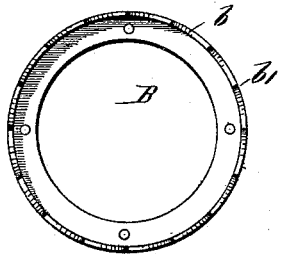
WITNESSES: INVENTOR
William Taylor
BY
Edgar Tate & Co.
ATTORNEYS

UNITED STATES PATENT OFFICE.

WILLIAM TAYLOR, OF KEARNY, NEW JERSEY.

BACK-PEDALING BRAKE.

SPECIFICATION forming part of Letters Patent No. 623,387, dated April 18, 1899.

Application filed February 17, 1898. Serial No. 670,659. (No model.)

*To all whom it may concern:*

Be it known that I, WILLIAM TAYLOR, a citizen of the United States, residing at Kearny, in the State of New Jersey, have invented certain new and useful Improvements in Bicycle Attachments, of which the following is a full and complete specification, such as will enable those skilled in the art to which it appertains to make and use the same.

This invention relates to bicycles, and has for its object to provide a clutch mechanism and brake for bicycles which are automatic and coöperative in their action and at the same time simple in construction and effective in operation.

The invention consists of an attachment for bicycles constructed substantially as hereinafter described, and defined in the claims.

The invention is fully disclosed in the following specification, of which the accompanying drawings form a part, in which the separate parts of my improvement are designated by the same letters of reference in each of the views, and in which—

Figure 1 is a vertical central section of my improved attachment in position on the pedal-shaft of a bicycle. Fig. 2 is a front view of the brake-plate. Fig. 3 is a vertical section on the line 3 3 of Fig. 1. Fig. 4 is a front view of the clutch-plate. Fig. 5 is an edge view of the same. Fig. 6 is a front view of the ratchet-plate, and Fig. 7 is a transverse section thereof.

Referring to the drawings, A represents the sprocket-wheel of a bicycle provided with my improved attachment. The sprocket-wheel is centrally recessed or countersunk to provide a seat for the ratchet-plate, which is located therein and suitably secured thereto. The ratchet-plate B is constructed, preferably, of a circular disk having an outwardly-extending flange or rim $b$, upon the edge of which is formed ratchet-teeth $b'$. The sprocket-wheel A is also provided with an annular brake-flange A', which projects outwardly from the face thereof and operates to inclose and protect the clutch mechanism.

Loosely sleeved on the pedal-shaft is the clutch-plate D, which is constructed of a circular disk of thin metal, having on its periphery a plurality of radial lugs $d$. In the face of the clutch-plate is formed a plurality of concentrically-curved slots $d'$, preferably four in number and equally spaced thereon. The upper and lower edges of the slots $d'$ are provided with outwardly and inwardly extending flanges $d^2$ $d^3$, which are oppositely inclined, forming cam-faces, four of which project from each face of the plate, as shown in Figs. 4 and 5.

The clutch-plate D is located upon the stud-plate E, hereinafter described, and the lugs $d$ of said plate are adapted to engage the ratchet-teeth $b'$, as will be hereinafter described.

A stud-plate E is fixed upon the pedal-shaft adjacent to the clutch-plate D. This plate is preferably provided with four radial arms $e$, near the outer ends of which are arranged headed studs $e'$ $e^2$, which extend on both sides thereof. The inner studs $e'$ pass through the curved slots $d'$, and the under surfaces of the heads thereof are adapted to engage the inclined flanges or cams $d^2$.

The brake-plate F is loosely sleeved upon the pedal-shaft adjacent to the stud-plate E and is formed of a circular disk of thin metal. Curved slots $f$ are formed in the body portion of the brake-plate, which correspond in number and location with the studs $e^2$ of the stud-plate E, with which they engage. Upon the upper and lower edges of these slots $f$ are formed outwardly and inwardly extending flanges or cams $f'$ $f^2$, which correspond in construction and arrangement with the cams $d^2$ $d^3$ on the clutch-plate D, except that the cam-faces of the cams $f'$ $f^2$ extend in reverse directions from the cam-faces of the cams $d^2$ $d^3$.

The brake-plate F is provided at its periphery with an inwardly-extending flange $f^3$, which is adapted to be forced into engagement with the inner surface of the brake-flange A' of the sprocket-wheel A. The flange $f^3$ of the brake-plate F is constructed with a horizontal portion and an inclined portion, and the inner surface of the brake-flange A' is correspondingly constructed, whereby dust, mud, and grit are excluded from the interior bearings.

A suitable cover-plate G is loosely sleeved upon the pedal-shaft and is suitably secured to the brake-flange A'.

The rotation of the pedal-shaft in propelling the bicycle rotates the stud-plate E and causes the studs $e'$ $e^2$ to move along the slots $d'$ of the clutch-plate D and the slots $f$ of the brake-plate F. The face of the stud-plate bears upon the cams $d^2$ of the clutch-plate D and forces the said clutch-plate into engagement with the ratchet-plate B, and motion is thereby imparted to the sprocket-wheel and the bicycle propelled. Simultaneously with the operation of the clutch mechanism the brake-plate F is forced away from its seat against the brake-flange A' by reason of the engagement of the stud-plate E with the cams $f'$ in a manner identical with that just described in regard to the clutch mechanism. By reason of the reverse inclinations of the cams of the clutch-plate and the brake-plate the forward rotation of the stud-plate effects the engagement of the clutch mechanism and the releasing of the brakes. When the rotation of the pedals is stopped, the studs of the plate E move rearwardly in the slots of the clutch-plate and brake-plate, and the under surface of the heads of said studs bears against the cams of the clutch-plate and brake-plate, releasing the clutch and setting the brake. The sprocket-wheel being then loose on the pedal-shaft and the brake set, the momentum of the wheel is instantly checked.

Having fully described my invention, I claim as new and desire to secure by Letters Patent—

1. In a bicycle attachment, the combination with a sprocket-wheel provided with ratchet-teeth, of a clutch-plate adapted to be thrown into and out of engagement with said ratchet-teeth, a stud-plate fixed upon the pedal-shaft, a brake-plate loosely sleeved upon said shaft, said brake-plate being adapted to engage said sprocket-wheel, substantially as and for the purpose set forth.

2. In a bicycle attachment, the combination with a sprocket-wheel provided with ratchet-teeth, of a clutch-plate adapted to engage said ratchet-teeth and provided with curved slots, cams arranged upon each face of said clutch-plate adjacent to said slots, a stud-plate fixed to the pedal-shaft, headed studs arranged on said stud-plate and extending through the slots of the clutch-plate and adapted to engage said cams, substantially as and for the purpose set forth.

3. In a bicycle attachment, the combination with a sprocket-wheel, a clutch mechanism connected therewith, a stud-plate fixed upon the pedal-shaft, a brake-plate sleeved upon said shaft and adapted to engage said sprocket-wheel, said brake-plate being provided with curved slots, cams arranged on each side of said brake-plate adjacent to said slots, headed studs arranged upon said stud-plate and extending through said slots and adapted to engage said cams, substantially as and for the purpose set forth.

4. In a bicycle attachment, the combination with the sprocket-wheel provided with ratchet-teeth, of a clutch-plate adapted to engage said ratchet-teeth and provided with curved slots, cams carried by said clutch-plate and arranged adjacent to said slots, a brake-plate adapted to engage said sprocket-wheel and provided with slots and cams corresponding to said clutch-plate, a stud-plate fixed to the pedal-shaft between said clutch-plate and said brake-plate, a plurality of headed studs arranged on said stud-plate and passed through the slots of the said plates and adapted to bear against said cams, substantially as and for the purpose set forth.

5. In a bicycle attachment, the combination with a sprocket-wheel provided with ratchet-teeth and an annular brake-flange surrounding said ratchet-teeth, of a clutch-plate, sleeved upon the pedal-shaft and adapted to engage said ratchet-teeth, and provided with curved slots, cams arranged on each face of the said clutch-plate adjacent to said slots, a brake-plate provided with a flange upon its periphery adapted to engage the inner surface of the brake-flange and provided with curved slots, cams arranged on each face of the said brake-plate adjacent to said slots, a stud-plate fixed to the pedal-shaft between the clutch-plate and the brake-plate, headed studs arranged upon each face of said stud-plate and extending through the slots of the clutch-plate and brake-plate and adapted to engage said cams, substantially as and for the purpose set forth.

In testimony that I claim the foregoing as my invention I have signed my name, in presence of the subscribing witnesses, this 22d day of January, 1898.

WILLIAM TAYLOR.

Witnesses:
L. M. MULLER,
M. A. KNOWLES.